United States Patent Office 2,865,877
Patented Dec. 23, 1958

2,865,877

COATING COMPOSITIONS COMPRISING AQUEOUS DISPERSIONS OF POLYMER SALTS AND ALKYLPHENOLETHYLENE OXIDE CONDENSATES AND ARTICLES COATED THEREWITH

Harold L. Hatton and Joseph A. Stieber, Philadelphia, and Frederick W. Toothill, Jr., Abington, Pa., assignors to Rohm & Haas Company, Philadelphia, Pa., a corporation of Delaware No Drawing. Application September 26, 1955
Serial No. 536,742

19 Claims. (Cl. 260—29.6)

The present invention relates to coating compositions and is particularly concerned with improved coating compositions adapted to be applied to a wide variety of substrates, and which are especially useful for application to porous substrates such as leather, for imparting either a dull or a glossy finish thereto with or without coloration, as by pigments, dyes, and so forth.

It has heretofore been suggested to apply to leather water-soluble salts of copolymers of maleic acid or the like with styrene or the like in extremely low concentrations of about one-half to 1% by weight of such salts in an aqueous solution thereof. After application of such salts to the leather, the latter was subjected to a glazing operation to impart a high gloss to the surface of the leather. Generally, also the salt of the copolymer was applied with a water-soluble plasticizer, such as glycerine. The permanently water-soluble character of such plasticizer rendered the treated leather subject to embrittlement with age. Furthermore, it was generally necessary to include an after-treatment with a hardening agent, such as formaldehyde or an alum, to impart adequate resistance to water in the finished leather.

It is a primary object of the present invention to provide an aqueous composition adapted to be applied to leather as well as other substrates for the purpose of producing a dull finish or, if desired, a glossy finish thereon without the necessity of undergoing a glazing operation of the type that is conventional in the leather-finishing industry. A further object is to provide an aqueous composition which can be applied from solutions or dispersions of relatively high concentration as of about 5% to 25% by weight of solids and which is of adequate flexibility to remain adhered to highly flexible bases, such as leather, even under severe bending operations in spite of the relatively thick coatings thereon obtained from the relatively high concentrations referred to. A further object is to provide a composition which comprises essentially water-soluble or readily water-dispersible ingredients which are adapted to form coatings which are characterized by good resistance to water even without the application of after-treatments with additional hardening agents, such as formaldehyde or alums. A further object is to provide an aqueous coating composition having highly flexible character which, however, contains no permanently water-soluble material, such as the plasticizer used in previously known compositions referred to above. Another important object of the present invention is to provide an aqueous composition that has excellent flow properties and is adapted to be applied to substrates by a wide variety of methods and especially by a spray-coating procedure. These and other objects and advantages of the invention will be apparent from the description thereof hereinafter.

One essential component of the compositions of the present invention is an ammonium or a volatile amine salt of a linear copolymer of an acid of the group consisting of acrylic, methacrylic, and itaconic acids with at least one ester of one of the acids containing in the copolymers from about 3 to about 20% by weight of salt units when calculated as the ammonium salt. For convenience, these salts will be referred to as copolymer salts of the first type. Volatile amines that may be used include methylamine, dimethylamine, trimethylamine, ethylamine, diethylamine, triethylamine, isopropylamine, morpholine, piperidine, pyrrolidine, etc. Esters of acrylic, methalcrylic, or itaconic acid that may be used include those of methyl, ethyl, isopropyl, propyl, n-butyl, t-butyl, sec-butyl, amyl, hexyl, cyclohexyl, octyl, t-octyl, decyl, dodecyl, hexadecyl and octadecyl alcohols. For most purposes, it is preferred that the ester component consist of acrylates of alcohols having 1 to 18 carbon atoms, or of methacrylates or itaconates of an alcohol having at least 5 carbon atoms, or of a mixture of such acrylates, methacrylates, and itaconates. The ester component, however, may comprise various proportions of a lower alkyl methacrylate or itaconate to increase the hardness of the final coating film, but preferably such hardening ester component is less than half of the entire ester components by weight. All of these copolymers are generally of high molecular weights averaging at least about 15,000 and generally averaging between 50,000 and 500,000 or more.

Aqueous solutions or dispersions of such copolymer salts are known and have been applied previously for the coating of various substrates. On drying, either by exposure to atmospheric air of normal temperatures or on heating to elevated temperatures to accelerate the rate of drying, coatings are obtained which are reasonably resistant to water in the absence of alkaline materials. The coatings may be obtained in a wide range of hardness and flexibility, the flexibility being in many cases reduced in proportion to increase in hardness. For example, quite flexible coatings are obtained when the copolymer is formed from acrylic acid and esters of acrylic acid or from acrylic acid and the esters of methacrylic acid with higher alcohols of at least 5 carbon atoms. Such coatings are generally quite soft, however, and, for many purposes, it is desirable to harden the coatings obtained. This may be done by replacing the acrylic acid with methacrylic acid or itaconic acid. Thus, copolymers of esters of acrylic acid with methacrylic acid or itaconic acid have somewhat greater hardness and are still of excellent flexibility. It has been found, however, that it is undesirable to obtain increased hardness by increasing the content of methacrylic acid beyond the upper limit of 20% specified hereinabove since undesirable water-sensitivity is obtained in the coated product. The copolymers may be further increased in hardness by the substitution of lower esters of methacrylic acid or itaconic acid, that is those having from 1 to 4 carbon atoms and especially methyl methacrylate, in place of part or all of the esters of acrylic acid or higher esters of methacrylic acid or itaconic acid. However, it has been found that solutions of the salts of such harder copolymers in many cases are extremely high in viscosity at suitable concentrations for spray-coating.

In accordance with the present invention, the linear copolymer salts of the first type are combined with a low molecular weight ammonium or amine salt of a linear copolymer of maleic anhydride and a branched chain unsaturated hydrocarbon including aliphatic olefines and unsaturated terpene types having 4 to 10 carbon atoms, the hydrocarbon and maleic anhydride being combined in approximately 1:1 mole ratio. This salt will be referred to as a copolymer salt of the second type. By blending such a linear copolymer salt of the second type, which is of hard character, with a linear copolymer salt of the first type, an increase in hardness is obtained. Furthermore, the low molecular weight olefin-maleic anhydride copolymer salt may be combined with relatively soft copolymer salts of the first group mentioned which still contain a relatively low proportion of the hardening lower esters of methacrylic acid or itaconic acid so that coatings of satisfactorily increased hardness are obtained and the solutions of the mixture of salts are of practical viscosity to make them amenable to spray-coating operations even at high concentrations of 10 to 20% solids in the aqueous solution or dispersion.

The olefin-maleic anhydride copolymer salts of the present invention should be of a molecular weight between about 500 and 5000. They may be salts of ammonia or of the volatile amines mentioned hereinabove which are used for making the salts of the first type of copolymer. The salts thus obtained are sometimes referred to herein simply as ammonium or amine salts even though, as is well known, salt groups may not be the only groups formed. The olefins may be isobutylene, isoamylene, branched chain hexenes, diisobutylene of the formula

$$H_3CC(CH_3)_2CH_2C(CH_3)=CH_2$$

and the terpenes may be dipentene, limonene, terpineol, and dicyclopentadiene. These copolymers may be produced by conventional procedures such as by copolymerization in an organic solvent, such as xylene or dioxane, in the presence of an initiator, such as benzoyl peroxide, lauroyl peroxide, cumene hydroperoxide, t-butyl perbenzoate, or the like. The usual procedures for isolating the copolymer may be employed, such as removal of solvent and monomer by distillation or separation of the copolymer when precipitated by filtration. If desired, copolymers of substantial homogeneity may be obtained for use in the present invention either by controlling polymerization conditions or by suitable fractionation of a heterogeneous polymer obtained.

Coatings may be obtained from a mixture of the two different types of copolymer salts so far described. However, it has been found that the copolymer salt of the olefin-maleic anhydride copolymer tends to increase the water-sensitivity of the coating relative to that which would be present when coatings are produced entirely from the first type of copolymer salt hereinabove described. Furthermore, the coatings obtained frequently have a cloudy appearance, apparently the result of incomplete compatibility of the two types of copolymer salts. In addition, the aqueous solution of the mixture of copolymer salts, though of low enough viscosity to make solutions having 10 to 20% concentration readily sprayable, nevertheless have a poor spreading quality and tend to foam severely, thereby rendering the coatings irregular in character.

In accordance with the present invention, it has been found that these disadvantages may be completely overcome by the incorporation with the two types of copolymer salts described hereinabove of a water-insoluble ethylene oxide condensate, or methyl or ethyl ethers thereof, of a higher alkylphenol containing from 1 to 5 oxyethylene units in the molecule. The alkyl group in the phenol should have from 8 to 18 carbon atoms and is preferably of branched chain character. For example, the alkyl group may be n-octyl, dodecyl, tetradecyl, hexadecyl, or octadecyl. It is preferably of branched chain character, such as in the case of t-octyl having the formula

$$H_3CC(CH_3)_2CH_2C(CH_3)_2-$$

The ethylene oxide/alkylphenol condensate serves to reduce foam or eliminate it, and increases water-resistance of the coating adequately to completely overcome the increased water-sensitivity that is obtained from the incorporation of the copolymer salt of the second type hereinabove. The phenol condensate or derivative also serves to compatibilize ingredients of the composition so that films of outstanding clarity and gloss are obtained when dulling agents are not used. In addition, the phenol derivative improves the wetting and spreading characteristics so that the aqueous composition has a type of flow that is remarkably similar to that of a lacquer-type of coating composition wherein the film-forming ingredients are dissolved in an organic solvent medium exclusively, an unusual characteristic insofar as aqueous coating compositions are concerned.

To obtain the various qualities outlined above, the several ingredients are combined in the following proportions: 33% to 90% by weight of the first type of copolymer salt, 5 to 45% of the second type of copolymer salt described above, and from 5% to 25% by weight of the phenol derivative. These precentages of the three components represent percentage of solids so that the addition of the percentage of each of these three ingredients should add up to 100. The proportion of the olefin-maleic anhydride copolymer salt may be varied depending upon the hardness of the first type of copolymer salt employed in the particular composition, a greater proportion of the olefin-maleic anhydride salt of the second type generally being used when softer ester-acid copolymer salts of the first type are employed. Preferred compositions contain from about 65% to 75% by weight of the ester-acid copolymer salt of the first type with 15% to 22% by weight of the olefin-maleic copolymer salt of the second type and 10% to 20% by weight of the phenol derivative.

The compositions may be made up by dissolving the dry copolymers in free acid form with ammonium hydroxide or a solution of an amine in water when they are water-soluble therein. Thereafter, the phenol derivative may be added, being dispersed by the ability of the other copolymer salts, especially that of the second type, to emulsify or disperse it. Alternatively, a copolymer of the first type may be made by copolymerization in an aqueous solution of the monomeric acids in which the monomeric ester is emulsified by means of such emulsifying agents as any of those of non-ionic type including particularly the ethylene oxide derivatives of higher alkylphenols containing from 8 to 18 carbon atoms in the alkyl group or groups and from about 8 to 100 oxyethylene units in the molecule of which t-octylphenoxypolyethoxyethanol containing about 10 oxyethylene units is representative. The olefin-maleic anhydride copolymer in the free acid or salt form may be added to such an aqueous dispersion of the first copolymer salt, sufficient ammonia or volatile amine being added to neutralize the salts if they are added in free acid form. The phenol derivative may then be added to the solution at any time either before or after the addition of the second type of copolymer salt. For application of the composition for coating purposes, it may be adjusted to concentrations of about 5% to 25% solids in the essentially aqueous medium. Preferably for most coating purposes including spray-coating operations, a concentration of 8 to 15% is used. In some cases, a small amount of lower alcohol has been found to even further improve the flow characteristics of the composition. For example, about ½% to 5% by weight of the lower alcohol, such as methanol, ethanol, isopropanol, or β-ethoxyethanol may be added based on the total weight of the aqueous composition. This alcohol, when used, may be added to the composition at any time.

The aqueous composition containing the three essential ingredients above with or without a small amount of alcohol may then be applied to the substrate to be coated by any suitable means including dipping, roller coating, application by brushes, and most important of all by spraying. After application, the coated substrate is dried either in the atmosphere at normal temperatures or preferably at elevated temperatures such as from 60° C. to 100° C. or higher depending upon the substrate and the time available in case of machine operations.

The coating on the substrate obtained from the composition of the present invention is essentially a mixture of the several components described hereinabove except that the copolymer salts are substantially converted into free acid, and/or amide, and/or imide, form as the result of the volatilization of ammonia or amine. The coating has excellent resistance to water, outstanding clarity, and high gloss (unless dulling agents are present), and it combines both flexibility and hardness to the extent predetermined by the selection of the two types of copolymer salts described hereinabove. The system is quite valuable for the finishing of leathers and other flexible substrates where flexibility is extremely important. At the same time, flexibility is combined with adequate hardness for most coating purposes. The coating composition is characterized by excellent adhesion to a wide variety of substrates so that the composition may be applied as a finish, either clear, glossy, dull or colored, for floors, woodwork, furniture, paneling, automobile bodies, and all sorts of metal and wood surfaces. It may also be applied to fabrics, such as for the purpose of producing a permanent finish as in the case of loom sizes or as top-coatings for artificial leather or oil cloth, and also to linoleum, asphalt tile, and other fabricated structures. It may be used as a silk screen printing ink. It is also useful for coating such porous substrates as paper and cardboard, which are extremely flexible, or for such porous substrates as stone, cement, or concrete. In all such applications, the composition of the present invention may be applied to previously coated surfaces as well as to those that have not been previously coated. Thus, in application to leather products, the composition of the present invention is extremely valuable as a top dressing for shoes or garment leathers which have previously been finished with colored finishes of either water-base or lacquer type.

The coating compositions are characterized by little or no foaming, good wettability and spreadability, in many cases having a flow characteristic of a lacquer type of coating composition, which is an unusual property for an aqueous system. In respect to the coating of leathers, gloss is obtained without a glazing operation. However, while glazing would be unsuitable for modifying a coated leather obtained by the present invention, the coated leather or other products may be treated by a plating operation, wherein the coated surface is pressed without rubbing against a smooth, hot surface such as of a polished metal plate. In addition, there is no need for subsequent treatment with hardening agents, such as formaldehyde or alums, the coating composition being of adequate water-resitance for normal purposes on mere drying thereof. However, such agents could be used to speed up the setting to insoluble condition. The flexibility of the coating composition is of permanent character, there being no permanently water-soluble plasticizer, such as glycerine, employed.

If desired, the composition may be modified from the clear transparent type hereinabove described by the incorporation of pigments, dyestuffs, or the like. From 1% to 120% by weight of pigment, on the weight of dispersion exclusive of pigment, may be incorporated. Generally, the pigment to binder ratio may be from 1:3.5 to 4:1. Most advantageously, the pigment or the like is worked into a mixture of the olefin-maleic anhydride copolymer salt with the phenol derivative in which the ratio of the copolymer salt to the latter is from 4:1 to 1:8. The pigment may be worked into a suitably dispersed condition by grinding in a mill, such as a pebble mill, colloid mill, a high speed stone mill, or a high shear mixer. Thereafter the pigment dispersion or paste thus obtained may be introduced into the aqueous dispersion of the copolymer salt of the first type, the proportions of the copolymer salts of the two types, the phenol derivative and the pigment being adjusted to the proportions hereinabove defined.

As inorganic white pigments and extender pigments, there may be mentioned white lead, zinc oxide, titanium pigments, lithopone, other zinc sulfide pigments, barium sulfate, calcium carbonate, silica, talc, mica, and clays, such as china clay. Pigment pastes normally comprise one or more of these or equivalent pigments. There may be added one or more insoluble inorganic or organic colors, such as iron oxide, carbon black, cadmium sulfide, toluidene red, lithol toner, chrome orange, chrome yellow, Hansa yellow, chrome green, phthalocyanine green, phthalocyanine blue, etc.

The pigmented dispersion may be applied to any of the substrates mentioned hereinabove by the various systems mentioned above including spray-coating operations. Thus, one or more coatings of such a pigmented system may be applied to a leather which may then be followed with a top coating of a clear aqueous composition of the present invention.

In the following examples, which are illustrative of the present invention, the parts are given by weight unless otherwise indicated:

*Example 1*

A coating composition comprising 70 parts by weight of the ammonium salt of a copolymer of 85 parts of ethyl acrylate with 15 parts of methacrylic acid, 15 parts of an ammonium salt of a copolymer of diisobutylene with maleic anhydride having a molecular weight of about 2,500, 15 parts of t-octylphenoxyethanol and 570 parts by weight of water is sprayed as a top coating on shoe leather. After drying, a glossy clear surface coating of high flexibility and good adhesion is obtained. It shows excellent resistance to wet rubbing.

*Example 2*

An excellent composition that produces a harder film than that of Example 1 and is adapted for application on furniture, linoleum, wood floors and asphalt tile comprises 33 parts of the first ammonium salt of Example 1, 42 parts of the second ammonium salt of Example 1, 25 parts of t-octylphenoxypolyethoxyethanol containing an average of 3 oxyethylene units, and 570 parts of water.

*Example 3*

A composition that produces a softer film than that of Example 1 and is adapted to be applied as a loom finish for textiles, such as those of polyethylene terephthalate (Dacron) comprises 67 parts of the first ammonium salt of Example 1, 11 parts of the second salt of Example 1, 22 parts of the same alkylphenol condensate as that of Example 2, and 570 parts of water.

*Example 4*

A composition that forms a film of hardness intermediate those of Examples 1 and 2 above comprises 60 parts of the ammonium salt of a copolymer of 68% by weight of ethyl acrylate, 17% methyl methacrylate, and 15% of methacrylic acid, 15 parts of the second ammonium salt of Example 1, 25 parts of the alkylphenol condensate of Example 2, and 570 parts of water. It is coated on leather and produces a glossy, flexible, and adherent finish thereon that is resistant to wet rubbing.

*Example 5*

(a) With 60 parts of the aqueous coating composition of Example 1, there is mixed 40 parts of titanium dioxide. This mixture is passed twice through a colloid mill.

(b) Then, there is mixed in 12.5 parts of an aqueous dispersion containing about 40% by weight of the sodium salt of an approximately 3% hydrolyzed copolymer of 80% ethyl acrylate with 20% methyl methacrylate. Two coats of this composition are applied to a dry leather after the fat-liquoring stage. The composition is characterized by excellent flow, freedom from streakiness, and good covering power.

(c) The coated leather is then top-coated with a mixture of 70 parts of the composition of Example 1, 25 parts of water, and 5 parts of a dispersion made in the same manner as that obtained in part (a) hereof. The finished leather has a glossy white surface that is resistant to wet rubbing.

Example 6

The procedure of Example 1 is repeated replacing the first ammonium salt with the ammonium salt of 87% ethyl acrylate, 10.5% methyl methacrylate and 2.5% itaconic acid. The coating is similar in character to that of Example 1.

Example 7

A composition that produces a softer film than that of Example 1 and is adapted to be used as a loom finish or a permanent finish for fabrics, especially of polyethylene terephthalate comprises 60 parts of the ammonium salt of a copolymer of 92.5% of ethyl acrylate with 7.5% of methacrylic acid, 20 parts of the second ammonium salt of Example 1, 20 parts of the alkyl phenol condensate of Example 2, and 400 parts of water.

Example 8

The process of Example 1 is repeated substituting a copolymer of dicyclopentadiene and maleic anhydride (1:1 molar ratio). A coating is obtained similar to that of Example 1.

Example 9

The process of Example 1 is repeated substituting a copolymer of terpineol and maleic anhydride (1:1 molar ratio). A coating is obtained similar to that of Example 1.

Example 10

The process of Example 1 is repeated substituting a copolymer of limonene and maleic anhydride (1:1 molar ratio). A coating is obtained similar to that of Example 1.

It is to be understood that changes and variations may be made without departing from the spirit and scope of the invention as defined in the appended claims.

We claim:

1. An aqueous coating composition comprising (1) 33 to 90 parts of a salt of a copolymer of at least one acid of the group consisting of acrylic, methacrylic, and itaconic acids with at least one ester of an acid of said group with an alcohol having 1 to 18 carbon atoms, said copolymer containing from about 3% to about 20% by weight of salt units when calculated as the ammonium salt, (2) 5 to 45 parts of a salt of a copolymer in approximately 1:1 mole ratio of maleic anhydride and a branched chain unsaturated hydrocarbon of 4 to 10 carbon atoms selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) 5 to 25 parts of a water-insoluble ethylene oxide condensate of a higher alkyl phenol containing an average of from 1 to 5 oxyethylene units and in which the alkyl group has 8 to 18 carbon atoms.

2. An aqueous coating composition comprising, at a concentration of 5% to 25% in water, a mixture of ingredients containing (1) 33 to 90 parts of a salt of a copolymer of at least one acid of the group consisting of acrylic, methacrylic, and itaconic acids with at least one ester of an acid of said group with an alcohol having 1 to 18 carbon atoms, said copolymer containing from about 3% to about 20% by weight of salt units when calculated as the ammonium salt, (2) 5 to 45 parts of a salt of a copolymer in approximately 1:1 mole ratio of maleic anhydride and a branched chain unsaturated hydrocarbon of 4 to 10 carbon atoms selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) 5 to 25 parts of a water-insoluble ethylene oxide condensate of a higher alkyl phenol containing an average of from 1 to 5 oxyethylene units and in which the alkyl group has 8 to 18 carbon atoms.

3. An aqueous coating composition comprising, at a concentration of 5% to 25% in water, a mixture of ingredients containing (1) 33 to 90 parts of a salt of a copolymer of at least one acid of the group consisting of acrylic, methacrylic, and itaconic acids with at least one ester of an acid of said group with an alcohol having 1 to 18 carbon atoms, said copolymer containing from about 3% to about 20% by weight of salt units when calculated as the ammonium salt, (2) 5 to 45 parts of a salt of a copolymer in approximately 1:1 mole ratio from maleic anhydride and a branched chain unsaturated hydrocarbon of 4 to 10 carbon atoms selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) 5 to 25 parts of a water-insoluble ethylene oxide condensate of a higher alkyl phenol containing an average of from 1 to 5 oxyethylene units and in which the alkyl group has 8 to 18 carbon atoms, and (4) 1 to 120 parts of a pigmentary material.

4. An aqueous coating composition comprising, at a concentration of 5% to 25% in water, a mixture of ingredients containing (1) 33 to 90 parts of a salt of a copolymer of at least one acid of the group consisting of acrylic, methacrylic, and itaconic acids with at least one ester of an acid of said group with an alcohol having 1 to 18 carbon atoms, said copolymer containing from about 3% to about 20% by weight of salt units when calculated as the ammonium salt, (2) 5 to 45 parts of a salt of a copolymer in approximately 1:1 mole ratio of maleic anhydride and a branched chain unsaturated hydrocarbon of 4 to 10 carbon atoms selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) 5 to 25 parts of a water-insoluble ethylene oxide condensate of a higher alkyl phenol containing an average of from 1 to 5 oxyethylene units and in which the alkyl group has 8 to 18 carbon atoms, and about 0.5% to 5% of a lower alcohol.

5. An aqueous composition comprising 33 to 90 parts of an ammonium salt of a linear copolymer of 5% to 20% of methacrylic acid with an ester of acrylic acid with an alcohol having 1 to 18 carbon atoms, 5 to 45 parts of a salt of a copolymer in 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and 5 to 25 parts of a water-insoluble ethylene oxide condensate of a higher alkyl phenol containing an average of from 1 to 5 oxyethylene units and in which the alkyl group has 8 to 18 carbon atoms.

6. An aqueous composition comprising, at a concentration of about 5% to 25% in water, a mixture comprising 33 to 90 parts of an ammonium salt of a linear copolymer of 5% to 20% of methacrylic acid with an ester of acrylic acid with an alcohol having 1 to 18 carbon atoms, 5 to 45 parts of a salt of a copolymer in 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and 5 to 25 parts of a water-insoluble ethylene oxide condensate of a higher alkyl phenol containing an average of from 1 to 5 oxyethylene units and in which the alkyl group has 8 to 18 carbon atoms.

7. An aqueous composition comprising, at a concentration of about 5% to 25% in water, a mixture comprising 33 to 90 parts of an ammonium salt of a linear copolymer of 5% to 20% of methacrylic acid with ethyl acrylate, 5 to 45 parts of a salt of a copolymer in 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and 5 to 25 parts of a water-insoluble ethylene oxide condensate of a higher alkyl phenol containing an average of from 1 to 5 oxyethylene units and in which the alkyl group has 8 to 18 carbon atoms.

8. An aqueous composition comprising, as a film-forming binder therein, a mixture comprising about 70 parts of an ammonium salt of a linear copolymer of 5% to 20% of methacrylic acid with ethyl acrylate, about 15 parts of a salt of a copolymer in 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and about 15 parts of t-octylphenoxyethanol.

9. An aqueous coating composition comprising, as a film-forming binder therein, a mixture comprising (1) 60 parts of an ammonium salt of a copolymer of about 68% ethyl acrylate, about 17% methyl methacrylate, and about 15% methacrylic acid, (2) about 15 parts of a salt of a copolymer in approximately 1:1 mole ratio of maleic anhydride and diisobutylene having a molecular weight of 500 to 5000 obtained by the addition of ammonium hydroxide to an aqueous dispersion of the copolymer to neutralize acid containing units in the copolymer, and (3) about 25 parts of t-octylphenoxypolyethoxyethanol having an average of about 3 oxyethylene units.

10. An aqueous coating composition comprising, as a film-forming binder therein, a mixture comprising (1) 70 parts of an ammonium salt of a copolymer of about 87% of ethyl acrylate, 10.5% of methyl methacrylate, and 2.5% of itaconic acid, (2) about 15 parts of a salt of a copolymer in approximately 1:1 mole ratio of maleic anhydride and diisobutylene having a molecular weight of 500 to 5000 obtained by the addition of ammonium hydroxide to an aqueous disperson of the copolymer to neutralize acid-containing units in the copolymer, and (3) about 15 parts of t-octylphenoxyethanol.

11. An aqueous composition comprising, as a film-forming binder therein, a mixture comprising about 70 parts of an ammonium salt of a linear copolymer of about 15% of methacrylic acid with about 85% of ethyl acrylate, about 15 parts of a salt of a copolymer in 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and about 15 parts of t-octylphenoxyethanol.

12. An article of manufacture comprising a substrate carrying a coating comprising (1) about 33% to 90% of a salt of a copolymer of about 5% to 20% by weight of at least one acid selected from the group consisting of acrylic, methacrylic, and itaconic acids with at least one ester thereof with an alcohol having 1 to 18 carbon atoms, (2) about 5% to 45% of a salt of a copolymer in 1:1 molar ratio of maleic anhydride and a branched chain unsaturated hydrocarbon having 4 to 10 carbons selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) about 5% to 25% of a water-insoluble ethylene oxide condensate of a higher alkyl phenol containing an average of from 1 to 5 oxyethylene units and in which the alkyl group has 8 to 18 carbon atoms.

13. An article as defined in claim 12 in which the substrate is leather.

14. An article of manufacture comprising a substrate carrying a coating formed by the drying of an aqueous dispersion comprising (1) about 33% to 90% of a salt of a copolymer of about 5% to 20% by weight of at least one acid selected from the group consisting of acrylic, methacrylic, and itaconic acids with at least one ester thereof with an alcohol having 1 to 18 carbon atoms, (2) about 5% to 45% of a salt of a copolymer in 1:1 molar ratio of maleic anhydride and a branched chain unsaturated hydrocarbon having 4 to 10 carbons selected from the group consisting of aliphatic olefines and unsaturated terpenes, the last-mentioned salt having a molecular weight of about 500 to 5000, each of the salts (1) and (2) being that obtained by the addition to an aqueous dispersion of the respective copolymer of a substance selected from the group consisting of ammonium hydroxide and volatile, water-soluble amines to neutralize acid-containing units in the copolymer, and (3) about 5% to 25% of a water-insoluble ethylene oxide condensate of a higher alkyl phenol containing an average of from 1 to 5 oxyethylene units and in which the alkyl group has 8 to 18 carbon atoms, and (4) 1% to 120% of a pigmentary material.

15. An article as defined in claim 14 in which the substrate is leather.

16. An article of manufacture comprising a substrate carrying a coating comprising a binder formed by the drying of an aqueous dispersion comprising (1) about 70% of an ammonium salt of a copolymer of about 15% of methacrylic acid with 85% ethyl acrylate, (2) about 15% of a salt of a copolymer in approximately 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and (3) about 15% of t-octylphenoxyethanol.

17. An article as defined in claim 16 in which the substrate is leather.

18. An article of manufacture comprising a substrate carrying a coating comprising a binder formed by the drying of an aqueous dispersion comprising (1) about 70% of an ammonium salt of a copolymer of about 15% of methacrylic acid with 85% ethyl acrylate, (2) about 15% of a salt of a copolymer in approximately 1:1 molar ratio of maleic anhydride and diisobutylene having a molecular weight of 500 to 5000 obtained by the addition of ammonium hydroxide to an aqueous dispersion of the copolymer to neutralize acid-containing units in the copolymer, and (3) about 15% of t-octylphenoxyethanol, said coating containing a pigment, the pigment to binder ratio being between 1:3.5 and 4:1.

19. An article as defined in claim 18 in which the substrate is leather.

(References on following page)

References Cited in the file of this patent

UNITED STATES PATENTS

| | | |
|---|---|---|
| 2,324,740 | Stoops et al. | July 20, 1943 |
| 2,386,764 | Zwicker | Oct. 16, 1945 |
| 2,490,677 | Cupery | Dec. 6, 1949 |
| 2,744,836 | Schubert | May 8, 1956 |

FOREIGN PATENTS

| | | |
|---|---|---|
| 371,041 | Great Britain | Apr. 14, 1932 |